United States Patent [19]

Parekh et al.

[11] Patent Number: 5,073,072

[45] Date of Patent: Dec. 17, 1991

[54] THREADED SPLIT-BUSHING FASTENER ASSEMBLY

[75] Inventors: Ebrahim Parekh; Jack E. Jensen, both of San Diego, Calif.; Jeffrey L. Summers, Littleton, Colo.

[73] Assignee: General Dynamics Corporation/Convair Division, San Diego, Calif.

[21] Appl. No.: 650,116

[22] Filed: Feb. 4, 1991

[51] Int. Cl.⁵ .................. F16B 19/00; F16B 35/02
[52] U.S. Cl. .................. 411/354; 411/384; 411/385; 411/908; 403/408.1
[58] Field of Search ............... 411/354, 385, 383, 384, 411/411, 424, 901, 908; 403/28-30, 408.1

[56] References Cited

U.S. PATENT DOCUMENTS 1,692,565 11/1928 Paul .................. 411/354
1,913,408 6/1933 Paul .................. 411/354
4,975,014 12/1990 Rufin et al. .................. 403/408.1

FOREIGN PATENT DOCUMENTS 1515194 1/1968 France .................. 411/385

Primary Examiner—Neill R. Wilson
Attorney, Agent, or Firm—John R. Duncan; Frank D. Gilliam; George T. Parsons

[57] ABSTRACT

The threaded split-bushing fastener assembly has been designed for high temperature applications such as on hypersonic vehicles. The fastener assembly consists of a pin (with a standard countersunk head at one end and a tapered end at the other end), a tubular threaded split-bushing, a nut, and a washer. Installation is accomplished by inserting the pin in the parts to be fastened, then slipping the washer and split-bushing on the tapered end of the pin and finally screwing the nut onto the split-bushing. Tightening of the nut allows preloading of the fastener assembly.

5 Claims, 1 Drawing Sheet

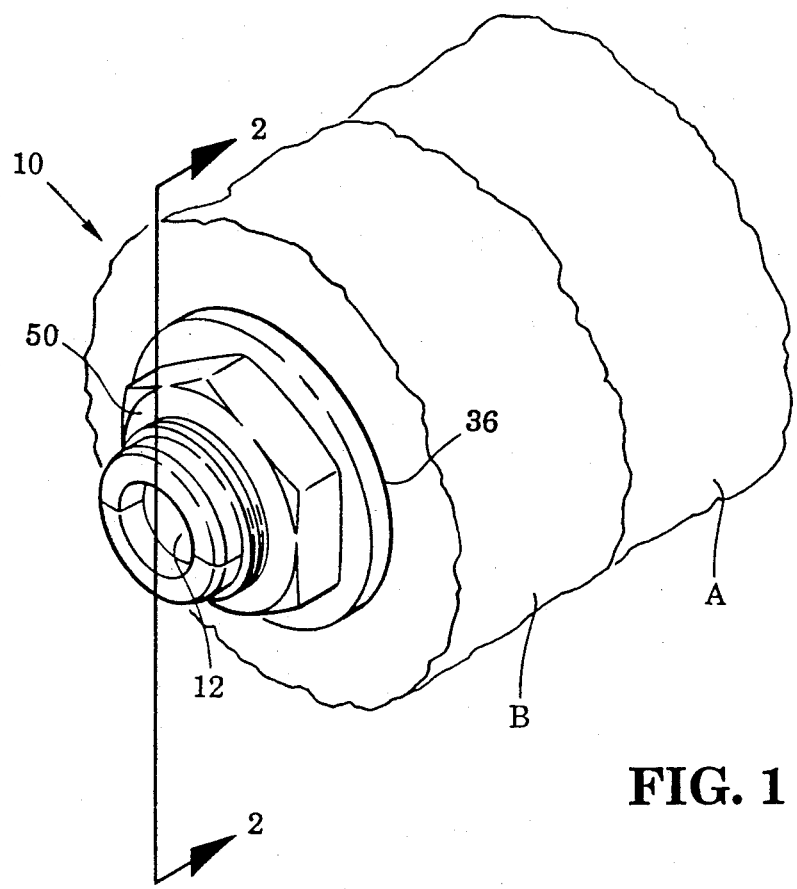
FIG. 1
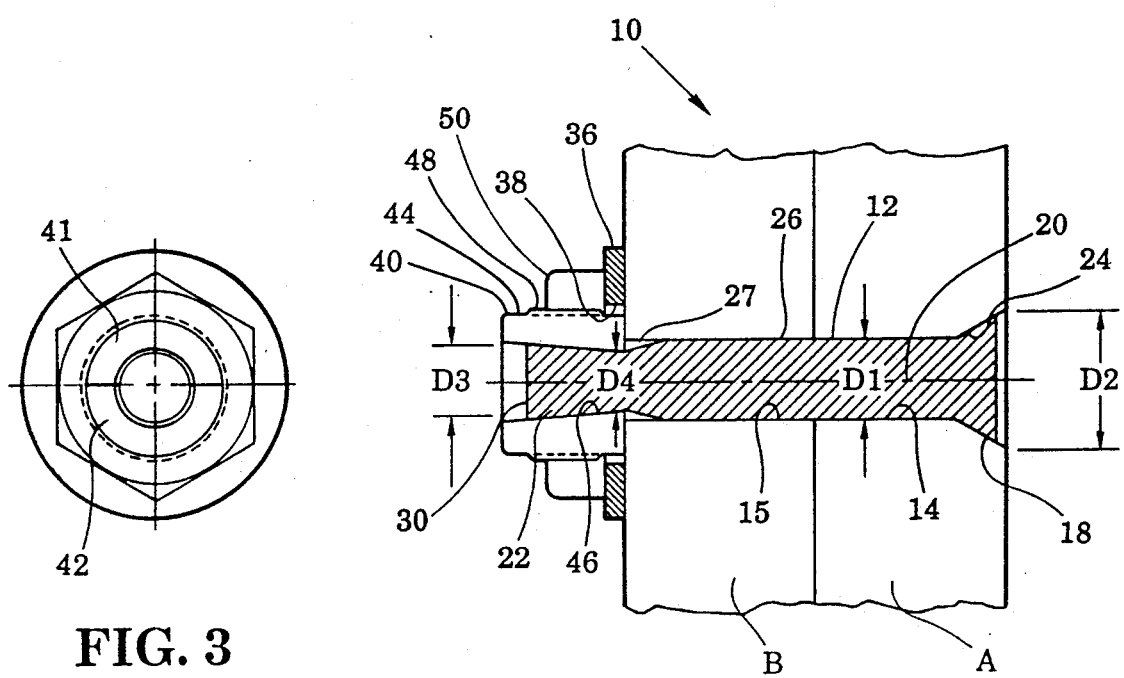
FIG. 3
FIG. 2

THREADED SPLIT-BUSHING FASTENER ASSEMBLY

FIELD OF THE INVENTION

The present invention relates to fasteners and more specifically to one that has adequate strength for oxidation resistance at high temperatures.

Presently conventional threaded fasteners cannot be used for high temperature applications because most fastener materials do not have adequate strength or oxidation resistance at high temperatures. The temperature resistant materials (like carbon-carbon composite) do not lend themselves to thread machining due to the material structure (thread machining yields threads with low shear strength). An example of an application requiring fasteners to be used in a high temperature environment would be those used on hypersonic vehicle structures.

It is an object of the invention to provide a novel threaded split-bushing fastener assembly that can be used in high temperature applications.

It is also an object of the invention to provide a novel threaded split-bushing fastener assembly that does not require thread machining and which can use temperature resistant materials such as ceramic and carbon-carbon composites.

It is another object of the invention to provide a novel threaded split-bushing fastener assembly that can be easily installed through aligned apertures in the parts to be fastened together and which can be locked in position by applying a predetermined torque to a nut that is threaded onto the split-bushing fastener.

It is a further object of the invention to provide a novel threaded split-bushing fastener assembly that can be used on hypersonic vehicle structures.

SUMMARY OF THE INVENTION

The novel threaded split-bushing fastener assembly has been designed for use in high temperature applications such as on hypersonic vehicle structures. The fastener assembly consists of a pin, a threaded tubular split-bushing, a nut, and a washer. The head portion of the pin has a standard countersunk head. The rear end portion of the pin is tapered from its rear end forwardly. A tubular split-bushing surrounds the tapered rear end portion of the pin. A nut is threaded onto the external threads of the tubular split-bushing and the washer is mounted on the pin adjacent the nut.

Installation is accomplished by inserting the pin in the parts to be fastened, then slipping the washer and the split-bushing on the tapered end of the pin. The nut is then threaded onto the alignment outer annular surface of the tubular split-bushing and then tightened with a pre-determined torque to complete the assembly.

For high temperature applications the pin of the novel fastener assembly can be made from temperature resistant material such as ceramic or carbon-carbon composites. The tubular split-bushing and nut can be made from any of the conventional metallic materials depending upon the application. The main advantage of this type of fastener assembly is it can utilize a material for the pin that is not amenable to thread machining and still allow a metallic threaded connection at the bushing end. The threaded connection also allows preloading of the fastener assembly and it can incorporate a locking feature.

BRIEF DESCRIPTION OF THE DRAWINGS

FIG. 1 is a front perspective view illustrating the novel threaded split-bushing assembly securing two parts together;

FIG. 2 is a cross sectional view taken along lines 2—2 of FIG. 1; and

FIG. 3 is a front elevation view of the novel threaded split-bushing fastener assembly.

DETAILED DESCRIPTION OF THE DRAWINGS

Applicant's novel threaded split-bushing fastener assembly will now be described by referring to FIGS. 1 through 3. The threaded split-bushing fastener assembly is generally designated numeral 10.

In the example illustrated, parts A and B are fastened together by the threaded split-bushing fastener assembly 10. The fastener 10 has a pin 12 that is inserted through aligned apertures 14 and 15 in the respective parts A and B.

Pin 12 has a head portion 18, a shank portion 20 and a rear end portion 22. Head portion 18 is configured in the shape of a countersunk head 24. It has a diameter D2. Shank portion 20 has a forward section 26 and a rearward section 27. Forward section 26 has a diameter D1. Rear end portion 22 has a rear end 30 whose diameter is D3. The diameter of rear end portion 22 tapers from its rear end forwardly and has a diameter D4 at its narrowest point. A washer 36 has a bore hole 38.

Tubular split bushing 40 has two halves 41 and 42. It also has an outer annular wall surface 44 and a tapered inner wall surface 46. External threads 48 are formed on outer annular split-bushing 40. A nut may be tightened on the split-bushing to a predetermined torque to complete the assembly.

We claim:

1. A threaded split-bushing fastener assembly comprising:
    an elongated pin having a predetermined length, said pin having a front end and a rear end;
    in sequence from its front end to its rear end, said pin has a head portion, a shank portion, and a rear end portion;
    said shank portion having an outer diameter D1, said head portion having a diameter D2 that is greater than D1;
    said rear end portion having an outer diameter D3 that is no greater than D1 and it tapers axially forwardly from its rear end first to a diameter D4 that is less than D1 by a predetermined amount and then to a diameter D1;
    a tubular split-bushing having a front end, a rear end, and inner annular surface and an outer annular surface, said bushing being split longitudinally into at least two pieces, said tubular split-bushing being removably engageable around the tapered outer surface of the rear portion of said pin; and
    means for preloading of the fastener assembly.

2. A threaded split-bushing fastener assembly as recited in claim 1 wherein said means for preloading of the fastener comprises external threads on the outer annular surface of said tubular split-bushing and a nut having internal threads that can be screwed onto said tubular split-bushing.

3. A threaded split-bushing fastener assembly as recited in claim 2 further comprising a washer having a bore hole whose diameter is at least as great as D1 and it is removably received on the rear end portion of said pin.

4. A threaded split-bushing fastener assembly as recited in claim 1 wherein the shank portion of said pin has a forward section and a rearward section, said forward section having a constant diameter D1 along its entire length, said rearward section having a diameter that tapers from D1 at its forward end to D4 at its rear end.

5. A threaded split-bushing fastener assembly as recited in claim 1 wherein said pin is made of non-metallic material.

* * * * *